United States Patent
Jiang et al.

(10) Patent No.: US 8,900,390 B2
(45) Date of Patent: Dec. 2, 2014

(54) METHOD FOR MAKING GRAPHENE/CARBON NANOTUBE COMPOSITE STRUCTURE

(75) Inventors: Kai-Li Jiang, Beijing (CN); Xiao-Yang Lin, Beijing (CN); Lin Xiao, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 270 days.

(21) Appl. No.: 13/303,310

(22) Filed: Nov. 23, 2011

(65) Prior Publication Data
US 2012/0298289 A1 Nov. 29, 2012

(30) Foreign Application Priority Data
May 27, 2011 (CN) .......................... 2011 1 0140262

(51) Int. Cl.
*C01B 31/00* (2006.01)
*C01B 31/04* (2006.01)

(52) U.S. Cl.
CPC ......... *C01B 31/0469* (2013.01); *C01B 2204/02* (2013.01); *C01B 2204/04* (2013.01); *C01B 2204/24* (2013.01); *C01B 2204/20* (2013.01)
USPC ....................................... 156/155

(58) Field of Classification Search
USPC ....................................... 156/155
See application file for complete search history.

(56) References Cited

U.S. PATENT DOCUMENTS

| | | |
|---|---|---|
| 2005/0271574 A1 | 12/2005 | Jang et al. |
| 2008/0248235 A1 | 10/2008 | Feng et al. |
| 2009/0268556 A1 | 10/2009 | Jiang et al. |
| 2009/0291270 A1 | 11/2009 | Zettl et al. |
| 2011/0017921 A1 | 1/2011 | Jiang et al. |
| 2011/0123776 A1 | 5/2011 | Shin et al. |
| 2012/0006784 A1* | 1/2012 | Lin et al. .......................... 216/36 |
| 2012/0192931 A1 | 8/2012 | Jeon et al. |
| 2012/0251764 A1 | 10/2012 | Jiang et al. |

FOREIGN PATENT DOCUMENTS

| | | |
|---|---|---|
| CN | 101239712 | 8/2008 |
| CN | 101442105 | 5/2009 |
| CN | 101734650 | 6/2010 |
| CN | 101760724 | 6/2010 |
| CN | 102717537 | 10/2012 |

(Continued)

OTHER PUBLICATIONS

Hong et al "Transparent, Flexible Conducting Hybrid Multilayer Thin Films of Multiwalled Carbon Nanotubes with Graphene Nanosheets", Jul. 6, 2010 ASCNano, vol. 4, No. 7, pp. 3861-3868.*

(Continued)

*Primary Examiner* — Jeff Aftergut
(74) *Attorney, Agent, or Firm* — Novak Druce Connolly Bove + Quigg LLP

(57) ABSTRACT

The present disclosure relates to a method for making a graphene/carbon nanotube composite structure. In the method, at least one graphene film is located on a substrate. At least one carbon nanotube layer is combined with the at least one graphene film located on the substrate to form a substrate/graphene/carbon nanotube composite structure. The at least one graphene film is in contact with the at least one carbon nanotube layer in the substrate/graphene/carbon nanotube composite structure. The substrate is removed from the substrate/graphene/carbon nanotube composite structure, thereby forming a graphene/carbon nanotube composite structure.

13 Claims, 11 Drawing Sheets

(56) References Cited

FOREIGN PATENT DOCUMENTS

| JP | 2009-91174 | 4/2009 |
| JP | 2010-52972 | 3/2010 |
| TW | 200833862 | 8/2008 |
| TW | 201103862 | 2/2011 |
| WO | WO2011016616 | 2/2011 |

OTHER PUBLICATIONS

Lee et al, "Versatile Carbon Hybrid Films Composed of Vertical Carbon Nanotubes Grown on Mechanically Compliant Graphene Films" Adv. Mater. 22, Mar. 2010, pp. 1247-1252.*

Bae et al, "Roll-to-roll production of 30-inch grapheme films for transparent electrodes" Aug. 2010 Nature Nanotechnology, vol. 5, pp. 574-578.*

Stankovich, Sasha, et al "Synthesis of graphene-based anaosheets via chemical reduction of exfoliated graphite oxide", Carbon, 45 (2007) 1558-1565.*

Chen, W., et al "Preparation of graphene by a low-temperature thermal reduction at atmosphere pressure", Nanoscale, 2010, 2, 559-563.*

Dingshan Yu et al.; "Self-Assembled Graphene/Carbon Nanotube Hybrid Films for Supercapacitors" The Journal of Physical Chemistry Letters, vol. 1(2010), p. 467-470, Dec. 22, 2009.

Xiaochen Dong et al.; "One-step growth of graphene-carbon nanotube hybrid materials by chemical vapor deposition"; Carbon, vol. 49, p. 2944-2949, Mar. 6, 2011.

* cited by examiner

METHOD FOR MAKING GRAPHENE/CARBON NANOTUBE COMPOSITE STRUCTURE

CROSS-REFERENCE TO RELATED APPLICATIONS

This application claims all benefits accruing under 35 U.S.C. §119 from China Patent Application No. 201110140262.4, filed on May 27, 2011, in the China Intellectual Property Office, the contents of which are hereby incorporated by reference.

BACKGROUND

1. Technical Field

The present disclosure relates to a method for making graphene/carbon nanotube composite structure.

2. Description of Related Art

Graphene and carbon nanotubes are both allotropes of carbon. Graphene is a carbonaceous material composed of carbon atoms densely packed in a two dimensional honeycomb crystal lattice. Graphene has excellent electrical and thermal properties. An electron mobility of graphene at room temperature is about 15000 $cm^2V^{-1}s^{-1}$. A thermal conductivity of the graphene is about 3000 $Wm^{-1}K^{-1}$. A carbon nanotube has a hollow cylindrical nanostructure formed by rolling the graphene. A carbon nanotube can have a large length-to-diameter ratio and is one dimensional Carbon nanotubes have excellent electrical, mechanical, and chemical properties. The carbon nanotubes and graphene can have a film structure. A composite film structure composed of the carbon nanotubes and the graphenes has received a great deal of interest because the properties of the carbon nanotube film structure and the graphene film structure can be complementary with each other.

Composite film structures composed of carbon nanotubes and graphemes can be created by a mixture of graphene fragments and carbon nanotube powder dispersed in a solvent. In the composite film structure, graphene is in the form of fragments, not a complete layer structure. Thus, the conductivity and ductility of the composite film structure is low. In addition, the carbon nanotubes are disorderly distributed in the compositied film structure. Thus, light transmittance of the composite film structure is relatively low.

What is needed, therefore, is to provide a graphene/carbon nanotube composite structure having excellent conductivity, ductility, and light transmittance.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
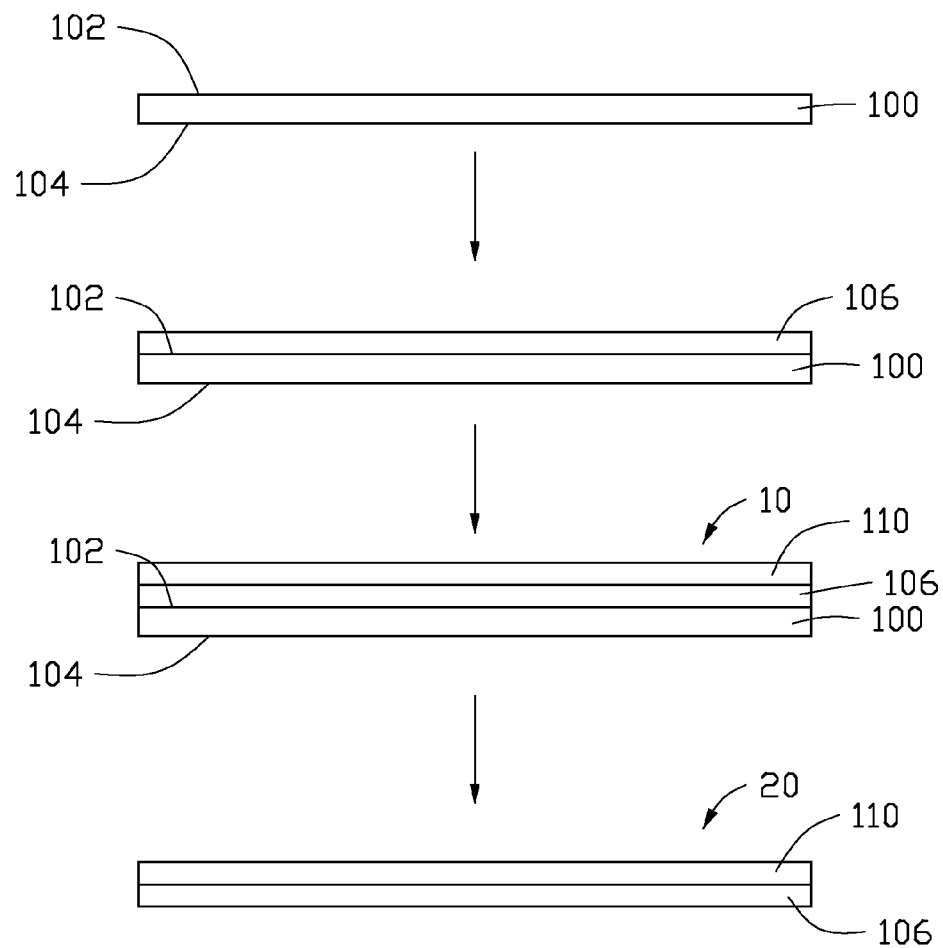
FIG. 1 shows a number of cross-sectional views of one embodiment of a method for making a graphene/carbon nanotube composite structure at various stages.

Referring to FIG. 1, one embodiment of a method for making a graphene/carbon nanotube composite structure 20 includes:

S1, providing a substrate 100 and at least one graphene film 106 located on the substrate 100;

S2, forming a substrate/graphene/carbon nanotube composite structure 10 by combining at least one carbon nanotube layer 110 with the at least one graphene film 106 located on the substrate 100, wherein the graphene film 106 is in contact with the carbon nanotube layer 110 in the substrate/graphene/carbon nanotube composite structure 10;

S3, forming a graphene/carbon nanotube composite structure 20 by removing the substrate 100 from the substrate/graphene/carbon nanotube composite structure 10.

In step S1, the substrate 100 has a first surface 102 and a second surface 104 opposite to the first surface 102. The first surface 102 of the substrate 100 can be a planar or curved surface. In one embodiment, an oxide layer can be further disposed on the first surface 102 of the substrate 100. A shape of the substrate 100 is not limited. A length, a width, and a thickness of the substrate 100 can be set as desired. For example, the thickness of the substrate 100 can be in a range from about 12.5 micrometers (μm) to about 50 μm. The substrate 100 can be made of metal or non-metal material. The metal material can be copper or nickel. The non-metal material can be quartz, glass, or plastic. In one embodiment, the substrate 100 is a silicon sheet having a cubical shape, a thickness of about 25 μm, and a side length of the first surface 102 is about 4 centimeters (cm).

The graphene film 106 is a two dimensional film structure. A thickness of the graphene film 106 can be in a range from about 0.34 nanometers (nm) to about 10 nm. The graphene film 106 can include at least one graphene layer. If the graphene film 106 includes a plurality of graphene layers, the plurality of graphene layers can overlap each other to form a large area, or stacked with each other to form a large thickness. In one embodiment, the graphene film 106 has a single graphene layer. The graphene layer is a one-atom thick planar sheet composed of a plurality of $sp^2$-bonded carbon atoms. The graphene film 106 having one graphene layer has a high transmittance of 97.7%. A heat capacity of the graphene film 106 can be less than $2\times10^{-3}$ $Pcm^2 \cdot K$. In one embodiment, the graphene film 106 having one graphene layer is less than $2\times10^{-7}$ J/cm$^2$·K. The graphene film 106 can be a free-standing structure. The term "free-standing structure" means that the graphene film 106 can sustain the weight of itself when it is hoisted by a portion thereof without any significant damage to its structural integrity. So, if the graphene film 106 is placed between two separate supports, a portion of the graphene film 106 not in contact with the two supports, would be suspended between the two supports and yet maintain structural integrity.

The graphene film 106 can be made by chemical vapor deposition method (CVD), mechanical pressure method, Langmuir-Blodgett (LB) method, solution method, or tearing from oriented graphite using a tape.

In one embodiment, the graphene film 106 is made by the mechanical pressure method. The mechanical pressure method includes:

S11, forming the oxide layer on the first surface 102 of the substrate 100 using plasma;

S12, disposing a highly oriented pyrolytic graphite (HOPG), having a cleavage surface on the oxide layer of the first surface 102 of the substrate 100, wherein the cleavage surface is in contact with the oxide layer;

S13, applying a pressure on the HOPG disposed on the substrate 100; and

S14, removing the HOPG from the substrate 100, thereby forming the graphene film 106 on the oxide layer of the substrate 100.

In step S13, before applying the pressure on the HOPG, the HOPG and the substrate 100 can be closely clipped in a clamp to be conveniently pressed. The pressure can be applied on the clamp. The pressure can be in a range from about 98 Pa to about 196 Pa. The pressure can be applied for about 5 minutes to about 10 minutes. The method for making the graphene film 106 is carried out in a sterilized room. In one embodiment, an area of the graphene film 106 formed by the mechanical pressure method is about 16 squared centimeter (cm$^2$), and includes a single graphene layer.

If the graphene film 106 is torn from the oriented graphite by a tape, the graphene film 106 is adhered to the tape. The graphene film 106 adhered to the tape can be then transferred to the substrate 100. A van der Waals attractive force between the graphene film 106 and the substrate 100 is larger than that between the graphene film 106 and the tape.

In step S2, the carbon nanotube layer 110 can be a carbon nanotube film structure. The carbon nanotube film structure includes a plurality of carbon nanotubes. The plurality of carbon nanotubes are uniformly distributed in the carbon nanotube layer 110. The carbon nanotubes can be single-walled, double-walled, or multi-walled carbon nanotubes. The carbon nanotubes are combined by van der Waals attractive force therebetween. The carbon nanotube film structure can be a free-standing structure. The carbon nanotubes in the carbon nanotube film structure can be orderly or disorderly arranged. The term 'disordered carbon nanotube film structure' includes a film structure where the carbon nanotubes are arranged along many different directions, such that the number of carbon nanotubes arranged along each different direction can be almost the same (e.g. uniformly disordered) and/ or entangled with each other. 'Ordered carbon nanotube film structure' includes a structure wherein the carbon nanotubes are arranged in a consistently systematic manner, e.g., the carbon nanotubes are arranged approximately along a same direction or have two or more sections within each of which the carbon nanotubes are arranged approximately along a same direction (different sections can have different directions). A thickness of the carbon nanotube film structure is not limited, and can be in a range from about 0.5 nanometers (nm) to about 1 cm. In one embodiment, the thickness of the carbon nanotube film structure is in a range from about 100 μm to about 0.5 millimeters (mm) The carbon nanotube film structure can have a plurality of micropores defined by the plurality of carbon nanotubes. A diameter of the micropore can be less than or equal to 50 μm. A heat capacity per unit area of the carbon nanotube film structure can be less than $2\times10^{-4}$ J/cm$^2$·K. In one embodiment, the heat capacity per unit area of the carbon nanotube film structure is less than or equal to $1.7\times10^{-6}$ J/cm$^2$·K. The carbon nanotube film structure can include at least one drawn carbon nanotube film, at least one flocculated carbon nanotube film, at least one pressed carbon nanotube film, or any combination thereof.

Figure 2:
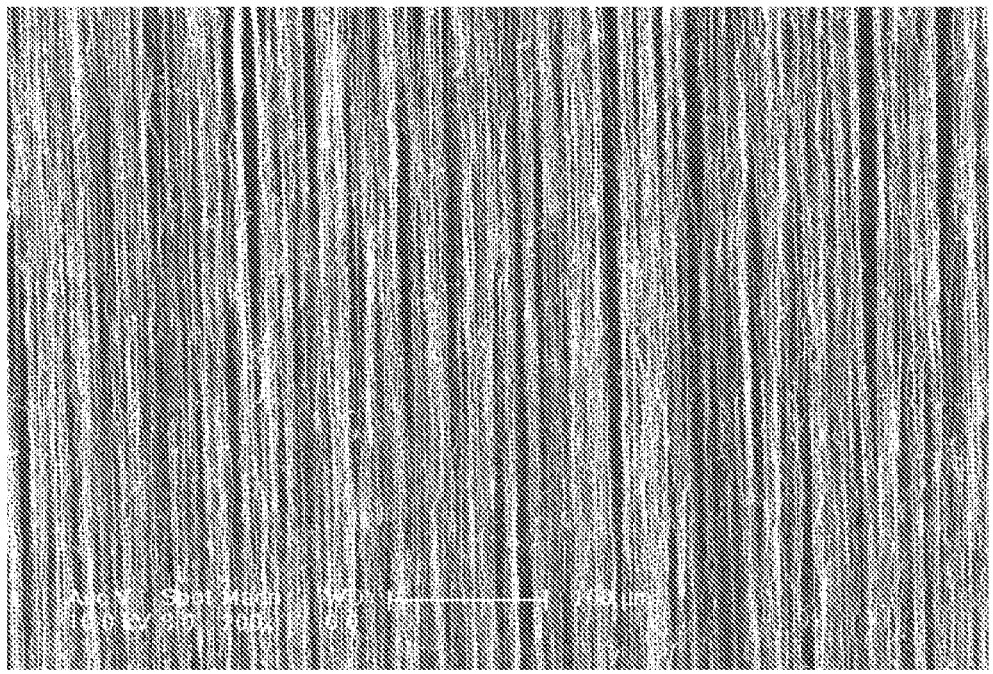
FIG. 2 is a Scanning Electron Microscopic (SEM) image of a drawn carbon nanotube film being used in the method of FIG. 1.

Referring to FIG. 2, the drawn carbon nanotube film includes a plurality of successive and oriented carbon nanotubes joined end-to-end by van der Waals attractive force therebetween. The carbon nanotubes in the drawn carbon nanotube film can be substantially aligned in a single direction and substantially parallel to a surface of the drawn carbon nanotube film. The drawn carbon nanotube film can be formed by drawing a film from a carbon nanotube array that is capable of having a film drawn therefrom. A large number of the carbon nanotubes in the drawn carbon nanotube film can be oriented along a preferred orientation, meaning that a large number of the carbon nanotubes in the drawn carbon nanotube film are arranged substantially along the same direction. A small number of the carbon nanotubes are randomly arranged in the drawn carbon nanotube film, and has a small if not negligible effect on the larger number of the carbon nanotubes in the drawn carbon nanotube film arranged substantially along the same direction. A thickness of the drawn carbon nanotube film can be in a range from about 0.5 nm to about 100 μm. Examples of a drawn carbon nanotube film is taught by U.S. Pat. No. 7,045,108 to Jiang et al., and WO 2007015710 to Zhang et al.

The carbon nanotube film structure can include a plurality of drawn carbon nanotube films stacked with each other. An angle between the adjacent carbon nanotube films is not limited.

Figure 3:
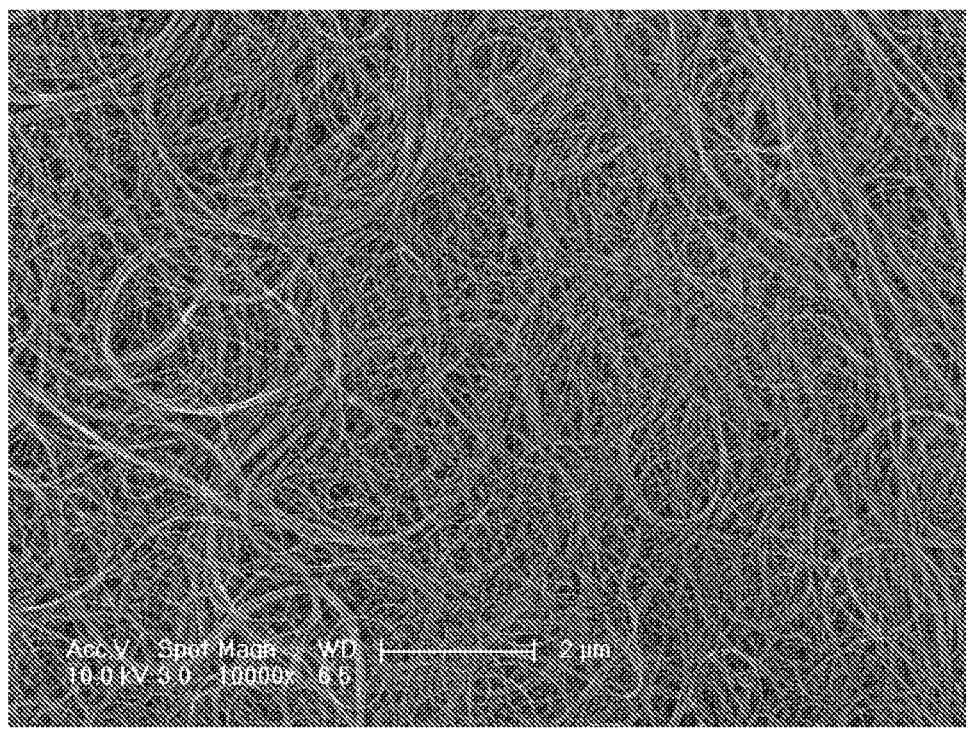
FIG. 3 is an SEM image of a flocculated carbon nanotube film being used in the method of FIG. 1.

Referring to FIG. 3, the flocculated carbon nanotube film can include a plurality of long, curved, disordered carbon nanotubes entangled with each other. A length of the carbon nanotubes can be larger than 10 cm. Furthermore, the flocculated carbon nanotube film can be isotropic. The carbon nanotubes can be substantially uniformly distributed in the flocculated carbon nanotube film. The adjacent carbon nanotubes are combined by the van der Waals attractive force therebetween, thereby forming an entangled structure with micropores defined therein. It is understood that the flocculated carbon nanotube film is very porous. Sizes of the micropores can be less than 10 μm. The porous nature of the flocculated carbon nanotube film will increase the specific surface area of the carbon nanotube film structure. Furthermore, the carbon nanotubes in the carbon nanotube film structure are entangled with each other, the carbon nanotube film structure employing the flocculated carbon nanotube film has excellent durability, and can be fashioned into desired shapes with a low risk to the integrity of carbon nanotube structure.

Figure 4:
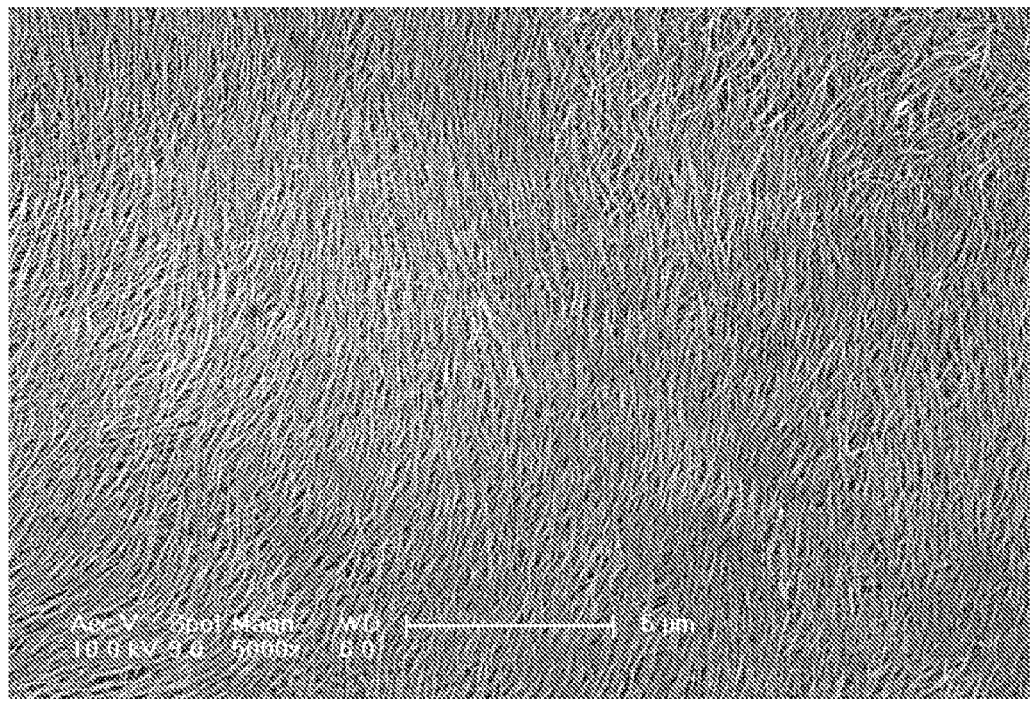
FIG. 4 is an SEM image of a pressed carbon nanotube film being used in the method of FIG. 1.

Referring to FIG. 4, the pressed carbon nanotube film includes a plurality of carbon nanotubes uniformly distributed. The pressed carbon nanotube film is formed by pressing a carbon nanotube array having aligned carbon nanotubes combined by van der Waals attractive force therebetween. By pressing, the carbon nanotubes are compressed or lay against the substrate. The carbon nanotubes in the pressed carbon nanotube film are arranged along a same direction or arranged along different directions. The carbon nanotubes in the pressed carbon nanotube film can overlap each other. Adjacent carbon nanotubes are combined and attracted by van der Waals attractive force, thereby forming a free-standing structure that can be separated from the substrate. An angle between a primary alignment direction of the carbon nanotubes and the substrate is in an approximate range from 0 degrees to approximately 15 degrees. The angle between a primary alignment direction of the carbon nanotubes and the substrate is closely related to pressure applied to the carbon nanotube array. The greater the pressure, the smaller the angle. The carbon nanotubes in the pressed carbon nanotube film can be parallel to the surface of the pressed carbon nanotube film when the angle is 0 degrees. A length and a width of the carbon nanotube film can be arbitrarily set as desired. An example of a pressed carbon nanotube film is taught by U.S. Pat. No. 7,641,885 to Liu et al.

Figure 5:
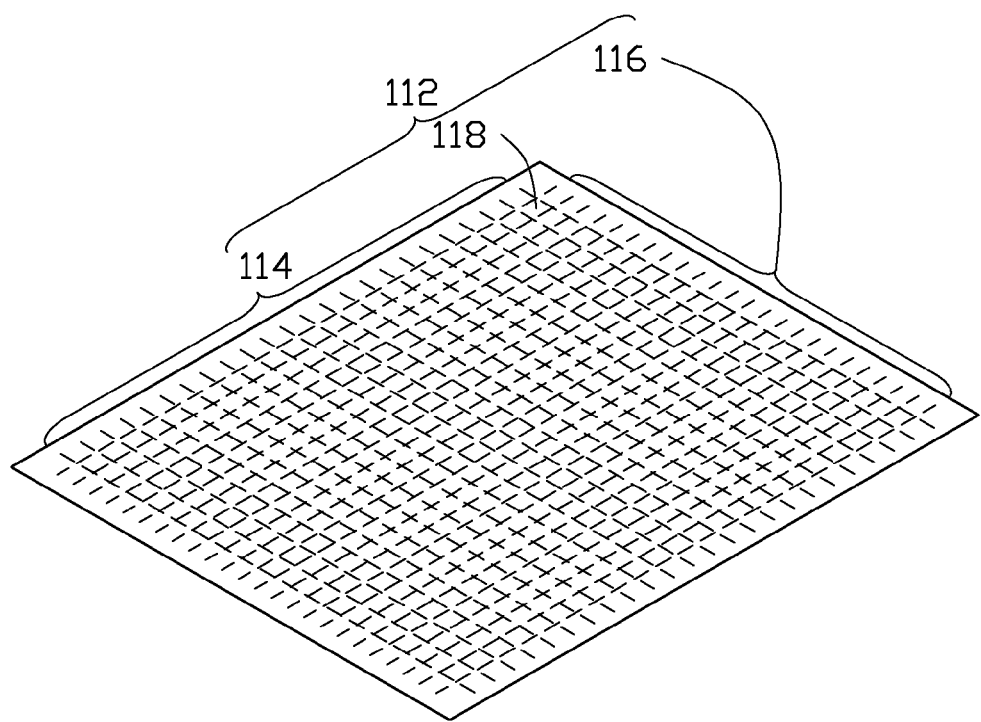
FIG. 5 is a schematic view of a carbon nanotube network structure being used in the method of FIG. 1.

Referring to FIG. 5, the carbon nanotube layer 110 can include a carbon nanotube network structure 112. The carbon nanotube network structure 112 can include a plurality of first carbon nanotube wire structures 114 and a plurality of second carbon nanotube wire structures 116. The plurality of first carbon nanotube wire structures 114 and the plurality of second carbon nanotube wire structures 116 intersect each other to form the carbon nanotube network structure 112. The plurality of first carbon nanotube wire structures 114 can be parallel to each other. The plurality of second carbon nanotube wire structures 116 can be parallel to each other. If the plurality of first carbon nanotube wire structures 114 are arranged along a first direction and spaced from each other, the plurality of second carbon nanotube wire structure 116 can be arranged along a second direction and spaced from each other. An angle between the first direction and the second direction can be in a range from larger than 0 degrees to about 90 degrees. A distance between the adjacent first carbon nanotube wire structures 114 is not limited and can be in a range from about 10 μm to about 1000 μm. A distance between the adjacent second carbon nanotube wire structures 116 is not limited and can be in a range from about 10 μm to about 1000 μm. In one embodiment, the distance between adjacent first carbon nanotube wire structures 114 is in a range from about 10 μm to about 500 μm, and the distance between adjacent second carbon nanotube wire structures 116 is also in a range from about 10 μm to about 500 μm. The intersections between the plurality of first carbon nanotube wire structures 114 and the plurality of second carbon nanotube wire structures 116 are not limited. For example, the first carbon nanotube wire structures 114 and the second carbon nanotube wire structures 116 can be woven together, or the first carbon nanotube wire structures 114 can be in contact with the second carbon nanotube wire structures 116 and be disposed at a same side of the second carbon nanotube wire structures 116. The contact portions of the first carbon nanotube wire structures and the second carbon nanotube wire structures can be fixed together by an adhesive. In addition, the first carbon nanotube wire structures 114 and the second carbon nanotube wire structures 116 can be combined with each other by heat pressing.

The carbon nanotube network structure 112 has a plurality of micropores defined by the first carbon nanotube wire structures 114 and the second carbon nanotube wire structures 116. A shape of the micropores is not limited and can be any polygonal shapes such as square, rhombus, or rectangle. A size of the micropores can be defined according to the distance between the adjacent first carbon nanotube wire structures 114 and the distance between the adjacent second carbon nanotube wire structures 116. The first carbon nanotube wire structure 114 or the second carbon nanotube wire structure 116 includes at least one carbon nanotube wire. If the first carbon nanotube wire structure 114 or the second carbon nanotube wire structure 116 includes a plurality of carbon nanotube wires, the plurality of carbon nanotube wires can be parallel to each other or twisted with each other. The plurality of carbon nanotube wires can be fixed together by adhesive.

Figure 6:
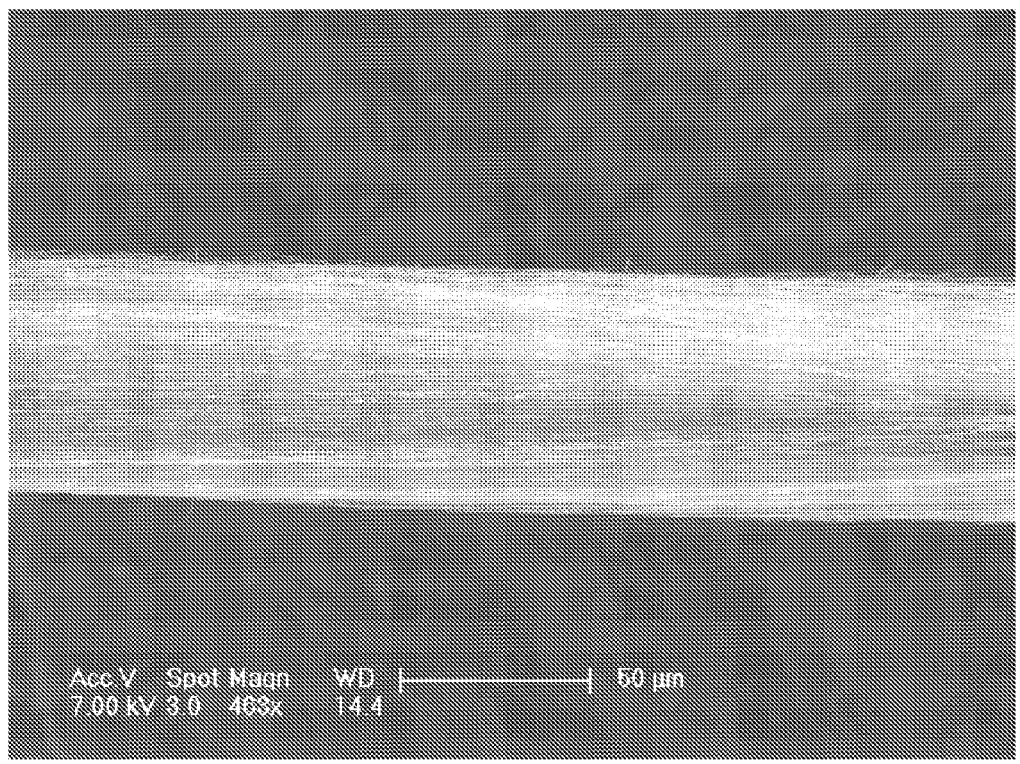
FIG. 6 is an SEM image of a non-twisted carbon nanotube wire being used in the method of FIG. 1.

The carbon nanotube wire can be a non-twisted carbon nanotube wire or a twisted carbon nanotube wire. Referring to FIG. 6, the non-twisted carbon nanotube wire includes a plurality of carbon nanotubes substantially oriented along a same direction (e.g., a direction along the length of the non-twisted carbon nanotube wire). The carbon nanotubes are substantially parallel to the axis of the non-twisted carbon nanotube wire. Specifically, the non-twisted carbon nanotube wire includes a plurality of carbon nanotubes joined end-to-end by van der Waals attractive force therebetween. A length of the non-twisted carbon nanotube wire can be arbitrarily set as desired. A diameter of the non-twisted carbon nanotube wire can range from about 0.5 nm to about 100 μm. The non-twisted carbon nanotube wire can be formed by treating a drawn carbon nanotube film with an organic solvent. Specifically, the drawn carbon nanotube film is treated by soaking the entire surface of the drawn carbon nanotube film with the organic solvent. After being soaked by the organic solvent, the adjacent parallel carbon nanotubes in the drawn carbon nanotube film will bundle together, due to the surface tension of the volatile organic solvent, and thus, the drawn carbon nanotube film will be shrunk into a non-twisted carbon nanotube wire. The organic solvent can be ethanol, methanol, acetone, dichloroethane or chloroform. In one embodiment, the organic solvent is ethanol. The non-twisted carbon nanotube wire treated by the organic solvent has a smaller specific surface area and a lower viscosity than that of the drawn carbon nanotube film untreated by the organic solvent. An example of the non-twisted carbon nanotube wire is taught by US Patent Application Publication US 2007/0166223 to Jiang et al.

Figure 7:
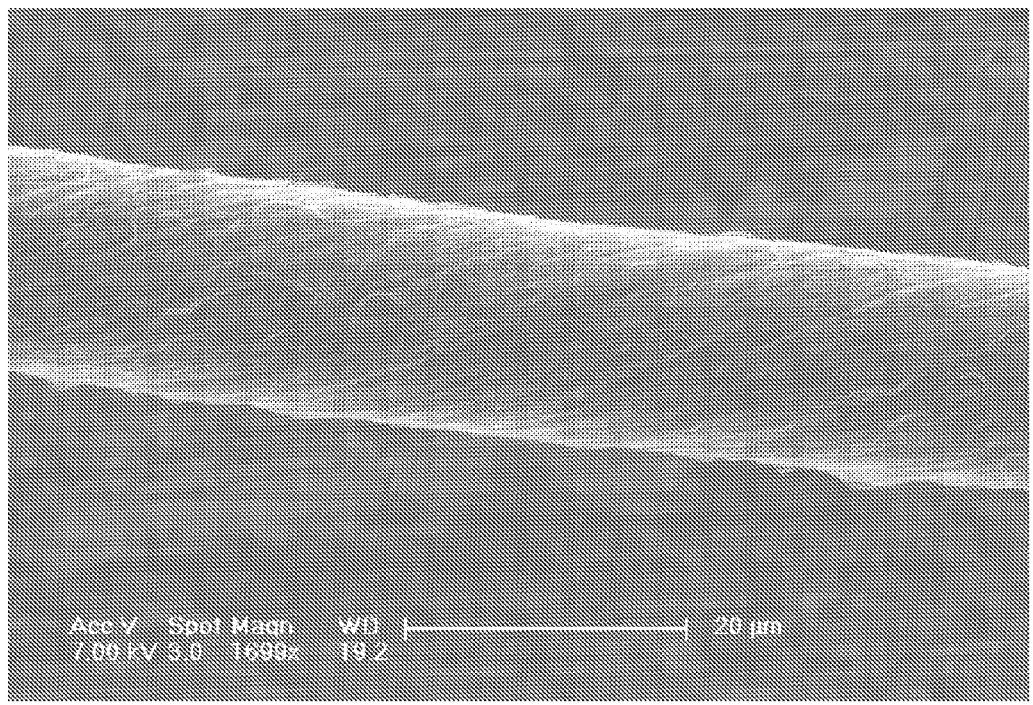
FIG. 7 is an SEM image of a twisted carbon nanotube wire being used in the method of FIG. 1.

The twisted carbon nanotube wire can be formed by twisting a drawn carbon nanotube film by using a mechanical force to turn the two ends of the drawn carbon nanotube film in opposite directions. Referring to FIG. 7, the twisted carbon nanotube wire includes a plurality of carbon nanotubes oriented around an axial direction of the twisted carbon nanotube wire. The carbon nanotubes are aligned in a helix around the axis of the twisted carbon nanotube wire. More specifically, the twisted carbon nanotube wire includes a plurality of successive carbon nanotube segments joined end-to-end by van der Waals attractive force therebetween. Each carbon nanotube segment includes a plurality of carbon nanotubes substantially parallel to each other and combined by van der Waals attractive force. The carbon nanotube segment has arbitrary length, thickness, uniformity and shape. A length of the twisted carbon nanotube wire can be arbitrarily set as desired. A diameter of the twisted carbon nanotube wire can range from about 0.5 nm to about 100 μm. Furthermore, the twisted carbon nanotube wire can be treated with a volatile organic solvent before or after being twisted. After being soaked by the organic solvent, the adjacent parallel carbon nanotubes in the twisted carbon nanotube wire will bundle together, due to the surface tension of the organic solvent. The specific surface area of the twisted carbon nanotube wire will decrease, and the density and strength of the twisted carbon nanotube wire will increase.

The at least one carbon nanotube layer 110 can overlap the graphene film 106 located on the substrate 100 to form a stacked structure. The stacked structure can be fixed together by three methods: a method (1); a method (2); or a method (3) as described below.

Figure 8:
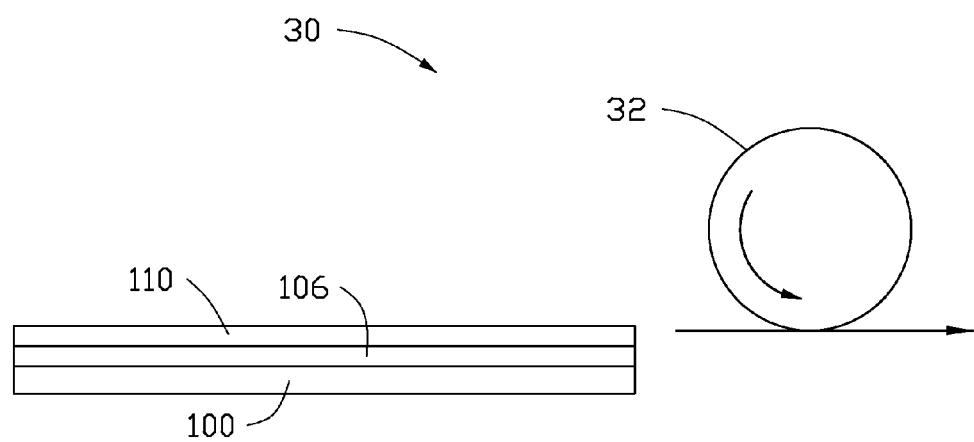
FIG. 8 is a schematic view of hot-pressing process being used in the method of FIG. 1.

Referring to FIG. 8, in the method (1), the stacked structure can be combined to form an integrative structure by hot pressing technology or cold pressing technology. In one embodiment, the hot pressing technology is used. A hot pressing device 30 used in hot pressing technology can include a pressing device and a heating device. In one embodiment, the pressing device is a metal roll 32.

Hot pressing technology includes:

S21, disposing the stacked structure in the hot pressing device 30;

S22, heating the metal roll 32 using the heating device of the hot pressing device 30, wherein the heating temperature can be in a range from about 70° C. to about 150° C.; and S23, hot pressing the stacked structure using the heated metal roll 32.

In step S23, the heated metal roll 32 can continuously roll on the stacked structure, thereby applying a pressure on the stacked structure. A rolling speed of the metal roll 32 can be in a range from about 1 millimeter per minute to about 10 meters per minute. In addition, the carbon nanotube layer 110 and the graphene film 106 can soften during the pressing of the stacked structure due to heating by the metal roll 32, and the air in the micropores of the stacked structure can be expelled. Thus, the carbon nanotube layer 110 and the graphene film 106 can be closely pressed together. In one embodiment, the pressure applied by the metal roll 32 is in a range from about 49 Pa to about 196 Pa.

In the method (2), an organic solvent is used to closely combine the stacked structure. The method (2) includes:

S21', infiltrating the organic solvent into the stacked structure; and

S22', closely combining the carbon nanotube layer 110 and the graphene film 106 together by removing the organic solvent.

In step S21', the organic solvent can be dropped into the stacked structure using a dropper, or the stacked structure can be immersed into a container having the organic solvent. The organic solvent can be a volatile organic solvent. The organic solvent can be ethanol, methanol, acetone, dichloroethane, chloroform, or any combination thereof. In one embodiment, the organic solvent is ethanol.

In step S22', after the organic solvent has infiltrated into the stacked structure, the carbon nanotube layer 110 will shrink due to the surface tension of the organic solvent as the organic solvent volatilizes. In one embodiment, the organic solvent can be removed by a supercritical carbon dioxide method. Specifically, the supercritical carbon dioxide method includes: disposing the stacked structure infiltrated by the organic solvent into a sealing device, wherein the sealing device has an inlet and an outlet; gradually sucking out the organic solvent from the outlet while importing a liquid carbon dioxide into the sealing device from the inlet, wherein a temperature and a pressure of the sealing device need to be adjusted so that the liquid carbon dioxide exists in the supercritical state; and removing the liquid carbon dioxide from the sealing device after the organic solvent has been completely removed. In one embodiment, the temperature of the sealing device is about 35° C., and the pressure of the sealing device is about 9 Mpa.

In the method (3), a macromolecule material layer is formed between the graphene film 106 and the carbon nanotube layer 110. The method (3) includes:

S21", disposing a macromolecule solution or a molten macromolecule between the graphene film 106 and the carbon nanotube layer 110; and S22", solidifying the macromolecule solution or the molten macromolecule to form a macromolecule material layer. The graphene film 106 and the carbon nanotube layer 110 are fixed together by the macromolecule material layer.

In step 21", the macromolecule solution or the molten macromolecule can be uniformly coated on a surface of the graphene film 106, or the graphene film 106 located on the substrate 100 can be immersed in the macromolecule solution. The macromolecule solution is formed by dissolving a macromolecule material into an organic solvent. The organic solvent can be ethanol, methanol, acetone, dichloroethane, chloroform, or any combination thereof. The molten macromolecule is formed by heating the macromolecule material to a molten temperature of the macromolecule material. The macromolecule material can be transparent. The macromolecule material can be phenolic resin (PF), polystyrene (PS), ethoxyline resin (EP), polyurethane (PU), polymethyl methacrylate (PMMA), polycarbonate (PC), polyethylene terephthalate (PET), or polyalkenamer. The macromolecule solution or the molten macromolecule can have a viscosity larger than 1 Pa·s.

In step S22", as the macromolecule solution or the molten macromolecule soldifies, the stacked structure can be further pressed using a force to closely combine the carbon nanotube layer 10 and the graphene film 106 with the macromolecule solution or the molten macromolecule. The solidified macromolecule material layer is very thin to avoid blocking the micropores of the carbon nanotube layer 110 and the graphene film 106.

In step S3, the substrate 100 can be removed by a solution erosion technology. The erosion technology can be set as the material of the substrate 100. In one embodiment, the substrate 100 is a silicon substrate. Before removing the silicon substrate using the solution erosion technology, the silicon substrate can be completely oxidized using oxygen plasma. In one embodiment, the substrate/graphene/carbon nanotube composite structure 10 is immersed into a sodium hydroxide (NaOH) solution, thereby causing a reaction between the oxidized silicon substrate and the NaOH solution. The oxidized silicon substrate is completely removed due to the reaction, and the graphene/carbon nanotube composite structure 20 is formed. The solution erosion technology is simple and easy to operate. The graphene/carbon nanotube composite structure 20 can be taken out from the solution. The carbon nanotube layer 10 has an excellent strength and can support the graphene film 106. Thus, the graphene film 106 is not easily broken due to a gravity of the solution. Furthermore, the solution can be removed after the reaction has completed. In one embodiment, the solution is removed by the supercritical carbon dioxide method, by which destruction of the graphene film 106 due to surface tension of the remaining solution can be avoided. Subsequently, the graphene/carbon nanotube composite structure 20 can be repeatedly washed with deionized water. In one embodiment, the graphene/carbon nanotube composite structure 20 can be washed with deionized water for 15 minutes, using 300 mL of deionized water.

Figure 9:
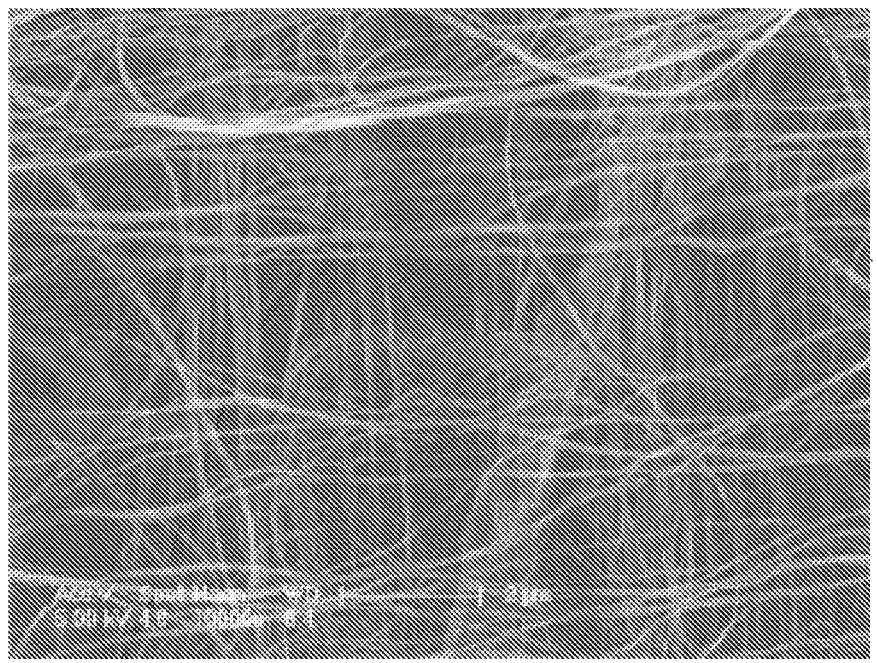
FIG. 9 is an SEM image of a graphene/carbon nanotube composite structure made by the method of FIG. 1.
Figure 10:
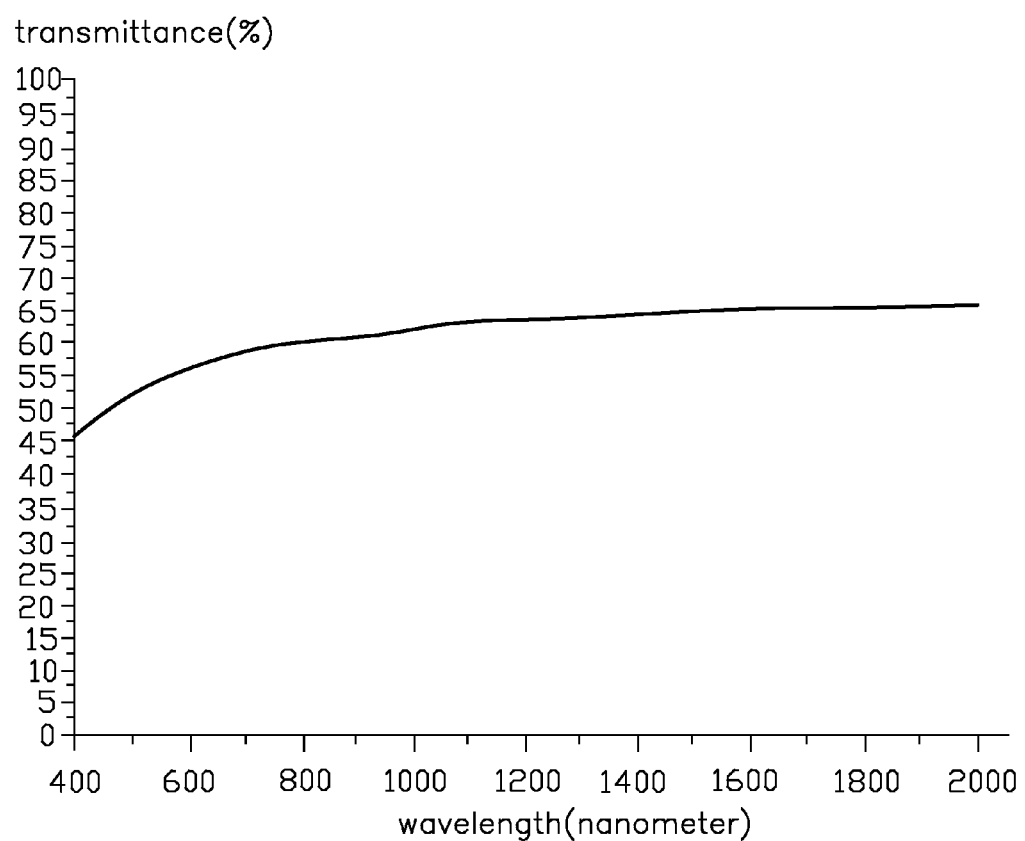
FIG. 10 is a test graph showing a transmittance of the graphene/carbon nanotube composite structure of FIG. 9.

Referring to FIG. 9, the graphene/carbon nanotube composite structure 20 includes at least one carbon nanotube layer 110 and at least one graphene film 106 overlapped with each other. The at least one graphene film 106 is supported by the carbon nanotube layer 110. The carbon nanotube layer 110 has a plurality of micropores, suspending a plurality of portions of the graphene film 106. If the graphene/carbon nanotube composite structure 20 includes a plurality of graphene films 106 and a plurality of carbon nanotube layers 110, the graphene films 106 and the carbon nanotube layers 110 can alternately overlap each other. A thickness of the graphene/carbon nanotube composite structure 20 can be in a range from about 10 nm to about 1 mm. Referring to FIG. 10, in one embodiment, a transmittance of the graphene/carbon nanotube composite structure 20 is larger than 60%. Thus, the graphene/carbon nanotube composite structure 20 has excellent transmittance. In one embodiment, a resistance of the graphene/carbon nanotube composite structure 20 is about 500 Ohm. The graphene/carbon nanotube composite structure 20 has excellent ductility and can be bent. The carbon nanotubes also has excellent conductivity along the axial direction. Therefore, the carbon nanotube layer 110 including the plurality of carbon nanotubes aligned along a direction also has excellent conductivity. In addition, the conductivity of the graphene film 106 is better than that of the graphene fragments. Furthermore, an air contact area of the graphene film 106 is large because the carbon nanotube layer 110 used to support the graphene film 106 has micropores. Thus, the heat capacity of the graphene/carbon nanotube composite structure 20 is low.

Figure 11:
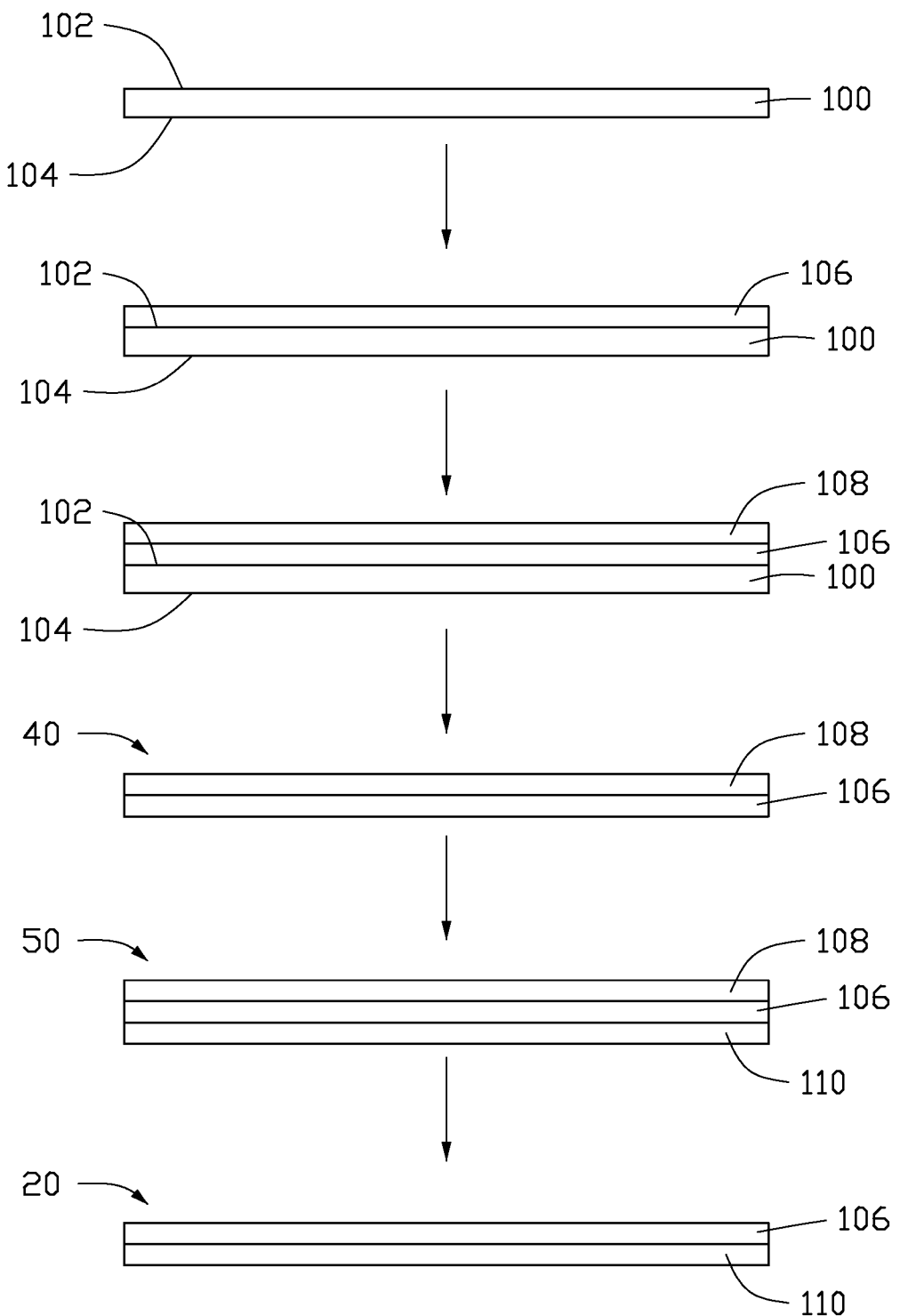
FIG. 11 shows a number of cross-sectional views of another embodiment of a method for making the graphene/carbon nanotube composite structure at various stages.

Referring to FIG. 11, another embodiment of a method for making the graphene/carbon nanotube composite structure 20 includes:

M1, applying at least one graphene film 106 on a substrate 100;

M2, coating a protective layer 108 on the at least one graphene film 106;

M3, forming a protective layer/graphene composite structure 40 by removing the substrate 100;

M4, forming a protective layer/graphene/carbon nanotube composite structure 50 by combining at least one carbon nanotube layer 110 with the protective layer/graphene composite structure 40 to, wherein the graphene film 106 is in contact with the carbon nanotube layer 110 in the protective layer/graphene/carbon nanotube composite structure 50; and M5, forming the graphene/carbon nanotube composite structure 20 by removing the protective layer 108 from the protective layer/graphene/carbon nanotube composite structure 50.

The step M1 is substantially the same as the step S1 of the above embodiment, and the step M4 is substantially the same as the step S2.

In step M2, the protective layer 108 can be used to protect the graphene film 106. The protective layer 108 can be made of a polymer material. The polymer material can be ethoxyline resin, bismaleimide resin, cyanate ester resin, polypropylene, polystyrene, polyvinyl alcohol, polystyrene enolate, polycarbonate, or polymethyl methacrylate. The protective layer 108 can be coated on the graphene film 106 by an immersing method, a spraying method, or a spin coating method. In one embodiment, the protective layer 108 is coated on the graphene film 106 by the spin coating method.

In step M3, the substrate 100 can be removed by an erosion technology. In one embodiment, the substrate 100 is a silicon substrate. The silicon substrate can be removed by immersing the silicon substrate in a sodium hydroxide solution. The protective layer 108 can protect the graphene film 106 to avoid being destroyed by the surface tension of the sodium hydroxide solution. When the silicon substrate is completely removed, the protective layer/graphenen composite structure 40 can be taken out from the solution. The carbon nanotube layer 110 having a plurality of micropores has excellent strength. Thus, the protective layer/graphenen composite structure 40 can be fished out from the remaining solution using the carbon nanotube layer 110, by which the protective layer/graphenen composite structure 40 can overlap the carbon nanotube layer 110. The solution infiltrated in the protective layer/graphene composite structure 40 can leak out through the micropores of the carbon nanotube layer 110.

In step M5, the protective layer 108 can be removed by a chemical reagent. The chemical reagent can be tetrahydrofuran, dichloroethane, chloroform, acetone, glacial acetic acid, dioxane, tetrahydrofuran, acetic ether, or toluene. In one embodiment, the protective layer/graphene/carbon nanotube composite structure 50 is immersed into the acetone to remove the protective layer, wherein the protective layer 108 is made of polymethyl methacrylate. Furthermore, the graphene/carbon nanotube composite structure 20 can be taken out from the chemical reagent and dried.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making graphene/carbon nanotube composite structure comprising:
   providing a substrate and at least one graphene film located on the substrate;
   stacking at least one carbon nanotube layer on the at least one graphene film located on the substrate to form a stacked structure;
   combining the stacked structure into an integrative structure by hot pressing or cold Pressing; forming a substrate/graphene/carbon nanotube composite structure, wherein the at least one graphene film is in contact with the at least one carbon nanotube layer in the substrate/graphene/carbon nanotube composite structure; and
   forming a graphene/carbon nanotube composite structure by removing the substrate from the substrate/graphene/carbon nanotube composite structure.

2. The method of claim 1, wherein the at least one graphene film is made by chemical vapor deposition method, mechanical pressure method, Langmuir-Blodgett method, solution method, or tearing from oriented graphite using a tape.

3. The method of claim 2, wherein the mechanical pressure method comprises:
   forming an oxide layer on a first surface of the substrate using plasma;
   disposing an oriented pyrolytic graphite having a cleavage surface on the oxide layer of the first surface of the substrate, wherein the cleavage surface is in contact with the oxide layer;
   applying a pressure on the oriented pyrolytic graphite disposed on the substrate; and
   removing the oriented pyrolytic graphite from the substrate, thereby forming the at least one graphene film on the oxide layer of the substrate.

4. The method of claim 3, wherein the pressure is in a range from about 98 Pa to about 196 Pa.

5. The method of claim 1, wherein a hot pressing temperature in the hot pressing technology is in a range from about 70° C. to about 150° C.

6. The method of claim 1, wherein the step of removing the substrate comprises oxidizing the substrate, and eroding the oxidized substrate using a solution.

7. The method of claim 6, wherein the substrate is oxidized using plasma.

8. The method of claim 6, wherein the substrate/graphene/carbon nanotube composite structure is immersed into the solution after the step of oxidizing the substrate, to remove the oxidized substrate.

9. The method of claim 8, wherein the solution is removed by supercritical carbon dioxide method after the step of eroding the oxidized substrate.

10. A graphene/carbon nanotube composite structure making method comprising:
provinding at least one graphene film on a substrate;
stacking at least one carbon nanotube layer on the at least one graphene film on the substrate to form a stacked structure;
forming a substrate/graphene/carbon nanotube composite structure, wherein the at least one graphene film is in contact with the at least one carbon nanotube layer in the substrate/graphene/carbon nanotube composite structure, the combining step comprises infiltrating an organic solvent into the stacked structure and removing the organic solvent by a supercritical carbon dioxide method; and
forming a graphene/carbon nanotube composite structure by removing the substrate from the substrate/graphene/carbon nanotube composite structure.

11. A graphene/carbon nanotube composite structure making method comprising:
providing at least one graphene film on a substrate;
stacking at least one carbon nanotube layer on the at least one graphene film on the substrate to form a stacked structure;
forming a substrate/graphene/carbon nanotube composite structure, wherein the at least one graphene film is in contact with the at least one carbon nanotube layer in the substrate/graphene/carbon nanotube composite structure, disposing a macromolecule solution or a molten macromolecule between the at least one graphene film and the at least one carbon nanotube layer; and solidifying the macromolecule solution or the molten macromolecule to form a macromolecule material layer adhering to the at least one graphene film on one side and to the at least one carbon nanotube layer on another side; and
forming a graphene/carbon nanotube composite structure by removing the substrate from the substrate/graphene/carbon nanotube composite structure.

12. The graphene/carbon nanotube composite structure making method of claim 11, wherein the macromolecule solution or the molten macromolecule has a viscosity larger than 1 Pa·s.

13. The graphene/carbon nanotube composite structure making method of claim 11, wherein the macromolecule solution or the molten macromolecule comprises a macromolecule material selected from the group consisting of phenolic resin, polystyrene, ethoxyline resin, polyurethane, polymethyl methacrylate, polycarbonate, polyethylene terephthalate, polyalkenamer, and any combination thereof.

* * * * *